(12) United States Patent
Runde (10) Patent No.: US 7,651,440 B2
(45) Date of Patent: Jan. 26, 2010

(54) CONTROL OF ENGINE TORQUE REDUCTION AT UPSHIFT INITIATION

(75) Inventor: Jeffrey K. Runde, Fishers, IN (US)

(73) Assignee: General Motors Corporation, Detroit, MI (US)

( * ) Notice: Subject to any disclaimer, the term of this patent is extended or adjusted under 35 U.S.C. 154(b) by 422 days.

(21) Appl. No.: 11/537,667

(22) Filed: Oct. 2, 2006

(65) Prior Publication Data

US 2008/0081735 A1     Apr. 3, 2008

(51) Int. Cl.
*F16H 61/00*     (2006.01)
(52) U.S. Cl. .................. 477/143; 477/109; 701/54; 701/66
(58) Field of Classification Search ................ 477/101
See application file for complete search history.

(56) References Cited

U.S. PATENT DOCUMENTS

| | | | |
|---|---|---|---|
| 5,669,849 A * | 9/1997 | Tabata et al. | 477/102 |
| 6,364,811 B1 | 4/2002 | Hubbard et al. | |
| 6,482,125 B2 * | 11/2002 | Urasawa | 477/107 |
| 2002/0039950 A1 * | 4/2002 | Graf et al. | 477/107 |
| 2004/0214687 A1 * | 10/2004 | Morisawa et al. | 477/109 |
| 2006/0135316 A1 * | 6/2006 | Fujii et al. | 477/156 |

* cited by examiner

*Primary Examiner*—David D Le
*Assistant Examiner*—Erin D Bishop
(74) *Attorney, Agent, or Firm*—Quinn Law Group, PLLC.

(57) ABSTRACT

An improved control for an automatically shiftable transmission upshift, wherein the engine output torque and on-coming clutch pressure are coordinated during the shift based on an inverse dynamic model of the transmission to achieve a desired output torque trajectory. At the initiation of an upshift, the engine torque is commanded to decrease in a ramp-like or sloping fashion to and engine output torque value calculated using the dynamic model. This ramp-like or sloping decrease provides smooth shifting, while reducing the likelihood of tie-up between on-coming and off-going clutches within the automatically shiftable transmission.

12 Claims, 6 Drawing Sheets

CONTROL OF ENGINE TORQUE REDUCTION AT UPSHIFT INITIATION

TECHNICAL FIELD

This invention relates to a model-based upshift control for an automatic transmission, and more particularly to control of engine torque reduction at upshift initiation.

BACKGROUND OF THE INVENTION

In general, an automatically shiftable transmission for a motor vehicle includes a number of gear elements and selectively engageable friction elements (referred to herein as clutches) that are controlled to establish one of several forward speed ratios between an input shaft and output shaft of the transmission. The input shaft is coupled to a power source, such as an internal combustion engine through a fluid coupling, such as a torque converter, and the output shaft is coupled to the vehicle drive wheels through a differential gearset. Shifting from a currently established speed ratio to new speed ratio involves, in most cases, disengaging a clutch (off-going clutch) associated with the current speed ratio and engaging a clutch (on-coming clutch) associated with the new speed ratio.

It is well known that transmission shifting can be controlled by manipulating the clutch pressures and the engine torque output during the shift for improved shift quality and transmission durability. Some control strategies use open-loop engine output torque controls to suppress engine flare during low torque upshifting, while others employ closed-loop engine torque and on-coming clutch pressure controls to maintain a desired constant output torque.

Ideally, these control strategies command a step-like reduction in engine torque at the instant that the on-coming clutch gains capacity. However, in practice, these two events rarely occur at the same time. If a step engine torque reduction occurs before the on-coming clutch gains capacity, a noticeable sag in engine torque would be felt by the operator of the vehicle. Calibration engineers have deemed this result unacceptable, therefore, typical transmission calibrations require the on-coming clutch to gain capacity prior to the step torque reduction.

As transmission calibrations have continued to be refined to produce smoother shifts, larger step torque reductions and lower initial on-coming clutch pressure commands have resulted. As this trend continued, it was determined that an initial on-coming clutch pressure could be calculated and commanded to not break free or release the off-going clutch until the step torque reduction had occurred. This method of operation also results in poor shift quality as a result of tie-up between the on-coming clutch and the off-going clutch prior to the engine torque reduction.

SUMMARY OF THE INVENTION

The present invention is directed to an improved control for an automatic transmission upshift, wherein the engine output torque and on-coming clutch pressure are coordinated during the shift based on an inverse dynamic model of the transmission to achieve a desired output torque trajectory. The desired output torque trajectory is influenced by operator demand, and an initial value of the desired output torque trajectory is used along with the engine output torque to develop an input acceleration trajectory. The inverse dynamic model of the transmission is used (1) to determine an engine output torque command that will achieve both the input acceleration trajectory and the desired output torque trajectory, and (2) to determine a feed-forward pressure command for the on-coming clutch that will produce the input acceleration trajectory, given the engine torque command. The desired output torque trajectory is used to determine the expected input speed, and a feed-back control term based on the deviation of the measured input speed from the expected input speed is used to adjust the on-coming clutch pressure command to account for model errors. Finally, the closed-loop feedback error is used to enable adaptive correction of the feed-forward control so that the feed-forward clutch pressure more nearly produces the commanded input shaft acceleration. Coordinating the on-coming pressure and engine output torque in this manner achieves more consistent shift feel and energy dissipation in the on-coming clutch, with less intensive calibration effort and improved adaptability to different powertrain and vehicle-type configurations. In the preferred embodiment, the engine torque reduction during shifting is accomplished by commanding engine output torque in a ramp-like or sloping fashion.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

The control of this invention is described in the context of a multi-ratio power transmission having a planetary geartrain and electro-hydraulic control of a type known to those skilled in the art. Accordingly, the geartrain and control elements shown in FIG. 1 hereof have been simplified.

Figure 1:
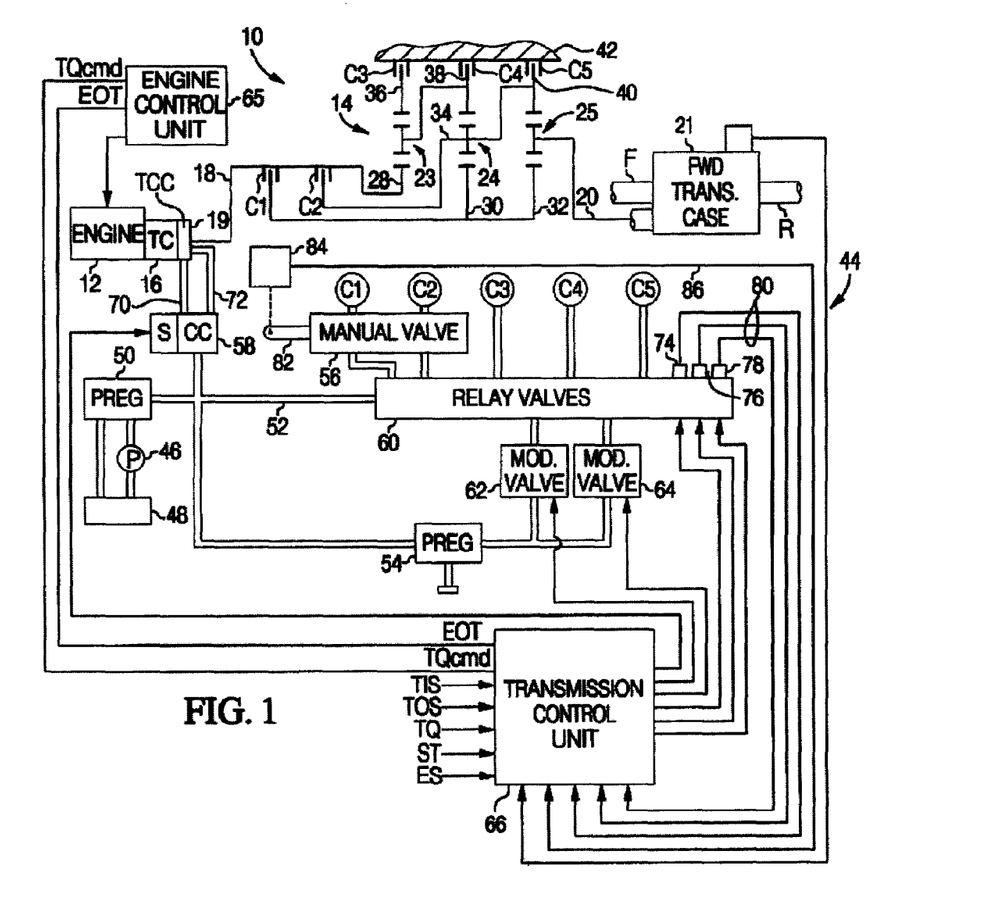
FIG. 1 is a schematic diagrammatic illustration of an automatic transmission and a microprocessor-based control unit for carrying out the control of the present invention.

Referring to FIG. 1, the reference numeral 10 generally designates a vehicular powertrain having an engine 12, transmission 14, and a torque converter 16 providing a fluid coupling between engine 12 and a transmission input shaft 18. A torque converter clutch 19 is selectively engageable under certain conditions to provide a mechanical coupling between engine 12 and transmission input shaft 18. The transmission output shaft 20 may be coupled to the driving wheels of the vehicle in one of several ways. The illustrated embodiment of FIG. 1 depicts a four-wheel-drive (FWD) application in which the output shaft 20 is connected to a transfer case 21, which is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition provided intermediate the two and four wheel drive conditions.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

Figure 2:
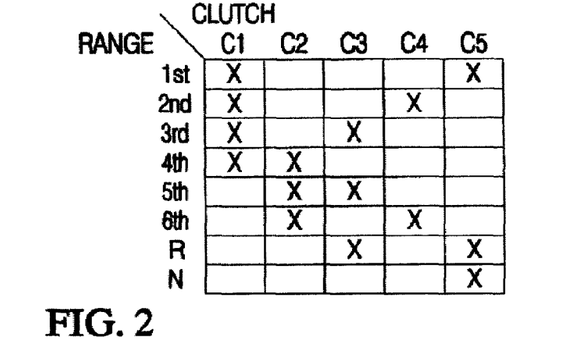
FIG. 2 is a truth table indicating the relationship between transmission clutch activation and corresponding speed ratios.

As diagrammed in FIG. 2, the state of the clutches C1 through C5 (i.e., engaged or disengaged) can be controlled to provide six forward speed ratios (1, 2, 3, 4, 5, 6), a reverse speed ratio (R), and a neutral condition (N). For example, the first forward speed ratio is achieved by engaging clutches C1 and C5. The shifting from one forward speed ratio to another is generally achieved by disengaging one clutch (referred to as the off-going clutch) while engaging another clutch (referred to as the on-coming clutch). For example the transmission 14 is shifted from the first forward speed ration to the second forward speed ratio by disengaging clutch C5 while engaging clutch C4.

The torque converter clutch 19 and the transmission clutches C1 through C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the operator of the vehicle and a number of solenoid operated fluid control valves 58, 60, 62, and 64.

The electronic portion of the control is primarily embodied in the engine control unit 65 and the transmission control unit 66, illustrated in FIG. 1 as two separate modules. Both control units 65, 66 are microprocessor-based, the construction and operation of which are known to those skilled in the art. The engine control unit 65 controls the operation of engine functions such as fuel, spark timing, etc. depending on the control variables afforded by engine 12, while the transmission control unit 66 controls the solenoid operated fluid control valves 58, 60, 62, and 64 based on a number of inputs to achieve a desired transmission speed ratio. The transmission control unit inputs include signals representing the transmission input speed TIS, an operator torque command TQ, and the transmission output speed TOS. Sensors for developing such signals are known to those skilled in the art, and have been omitted for simplicity. Additionally, the engine control unit 65 supplies an engine output torque signal EOT to the transmission control unit 66, and the transmission control unit 66 supplies a torque command signal TQcmd to engine control unit 65.

A control lever 82 of the manual valve 56 is coupled to a sensor and display module 84 that produces a diagnostic signal on line 86 based on the control lever position; such signal is conventionally referred to as a PRNDL signal, since it indicates which of the transmission ranges (Park, Reverse, Neutral, Drive or Low) has been selected by the operator of the vehicle. Finally, the fluid control valves 60 are provided with pressure switches 74, 76, 78 for supplying diagnostic signals to the control unit 66 on lines 80 based on the respective relay valve positions. The control unit 66, in turn, monitors the various diagnostic signals for the purpose of electrically verifying proper operation of the controlled elements within the electro-hydraulic control system 44.

The solenoid operated fluid control valves 58, 60, 62, and 64 are generally characterized as being either on/off or modulated type control valves. To reduce cost, the electro-hydraulic control system 44 is configured to minimize the number of modulated fluid control valves, as modulated valves are generally more expensive to implement. To this end, a set of three on/off relay valves, shown in FIG. 1 as a consolidated block of fluid control valves 60, are utilized in concert with manual valve 56 to enable controlled engagement and disengagement of each of the clutches C1 through C5 with only two modulated fluid control valves 62, 64. For a selected ratio, the control unit 66 activates a particular combination of on/off relay fluid control valves 60 for coupling one of the modulated fluid control valves 62, 64 to the on-coming clutch, and the other modulated fluid control valve 62, 64 to the off-going clutch.

The modulated fluid control valves 62, 64 each comprise a conventional pressure regulator valve biased by a variable pilot pressure that is developed by current controlled force motor, not shown. The fluid control valve 58 is also a modulated type valve, and controls the fluid supply path to the converter clutch 19 in lines 70, 72 for selectively engaging and disengaging the converter clutch 19. The transmission control unit 66 determines pressure commands for smoothly engaging the on-coming clutch while smoothly disengaging the off-going clutch, develops corresponding force motor current commands, and supplies the current to the respective force motors in accordance with the current commands.

Figure 3:
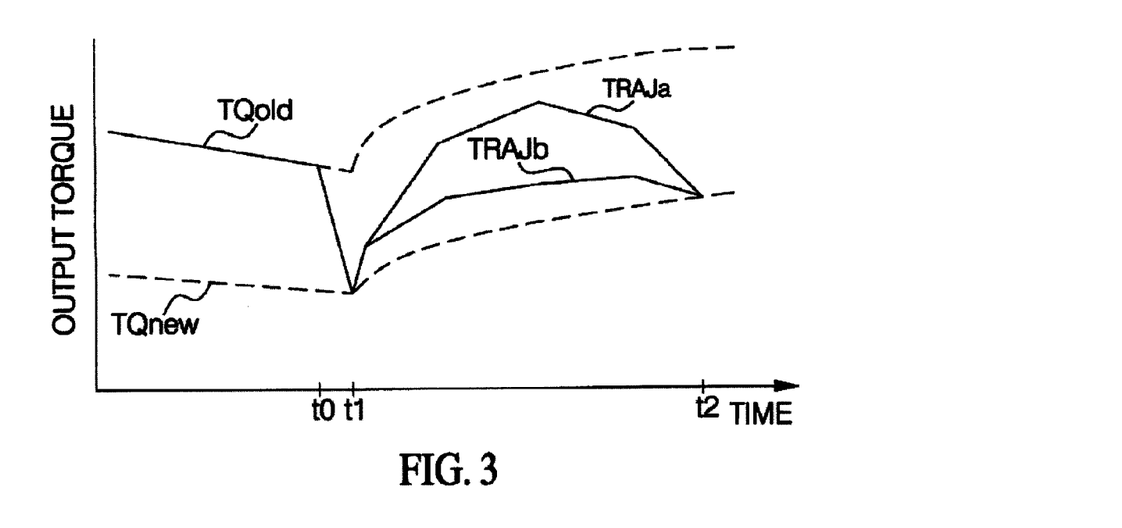
FIG. 3 graphically depicts the output torque of the transmission of FIG. 1 during a power-on upshift.

FIG. 3 graphically depicts the output torque of transmission 14 during a power-on upshift. Prior to the torque phase of the shift, the output torque follows a trajectory TQold determined by the product of input torque and the old (current) speed ratio, whereas after the shift is completed, the output torque follows a trajectory TQnew determined by the product of the input torque and the new speed ratio. In the torque phase of the shift, the torque carried by the off-going clutch transitions to the on-coming clutch, and the output torque transitions from the TQold trajectory to the TQnew trajectory in the time interval t0-t1. In the inertia phase of the shift (time interval t1-t2), the engine 12 is decelerated to its post-shift speed, and the output torque rises above the TQnew trajectory to a variable degree depending on the input torque and the on-coming clutch pressure.

The trajectory of the output torque during the inertia phase determines, in large part, what is referred to as the shift feel. A high output torque trajectory, such as the trajectory TRAJa, will produce a firm shift feel, whereas a low output torque trajectory, such as the trajectory TRAJb, will produce a soft shift feel. In many control strategies, the various control parameters are scheduled to produce a shift feel that is appropriate for the operator torque demand—firmer shift feel at higher torque demand, and softer shift feel at lower torque demand. Additionally, operator preferences may be taken into account, with Normal and Towing modes, for example. With open-loop controls the desired shift feel is scheduled by suitable calibration of the on-coming clutch pressure profile. With closed-loop controls the desired shift feel is scheduled by forcing a speed or torque parameter to follow a predetermined trajectory. The open-loop approach is inherently calibration intensive, and generally un-suited to applications involving several different engine and vehicle configurations. The closed-loop approach is hindered by hydraulic delays, and frequently exhibits considerable error between the pre-determined trajectory and the corresponding measured parameter. In either approach, it may be difficult to achieve coordinated control of both the on-coming clutch pressure and engine output torque.

The present invention utilizes an inverse dynamic model of the transmission to achieve a desired shift feel with a coordinated control of the engine output torque and the on-coming clutch pressure. Operator demand, mode and vehicle loading characteristics are used to develop a desired output torque trajectory TRAJout_tq corresponding to the desired shift feel. The output torque trajectory is conveniently implemented with a scale factor Ksf having a profile that defines the output torque trajectory in terms of the trajectories TQold and TQnew. That is, the desired output torque trajectory TRAJout_tq may be defined as:

$$TRAJout\_tq = K_{sf}(TQold - TQnew) + TQnew$$

Figure 4:
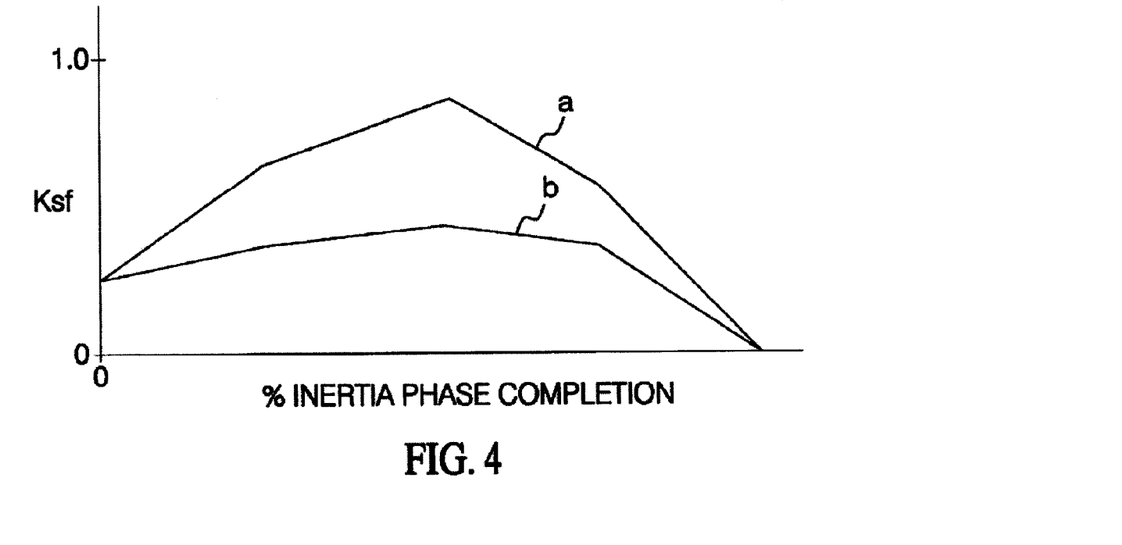
FIG. 4, graphically depicts a scale factor used in the development of a desired output torque trajectory.

In this approach, the Ksf can be determined by table look-up as a function of operator torque demand (throttle position, for example) and the time fraction of inertia phase completion. FIG. 4 shows two exemplary scale factor profiles corresponding to the two inertia phase output torque traces of FIG. 3. In particular, the scale factor profile "a" corresponds to the output torque trajectory TRAJa, and the scale factor profile "b" corresponds to the output torque trajectory TRAJb.

Figure 5:
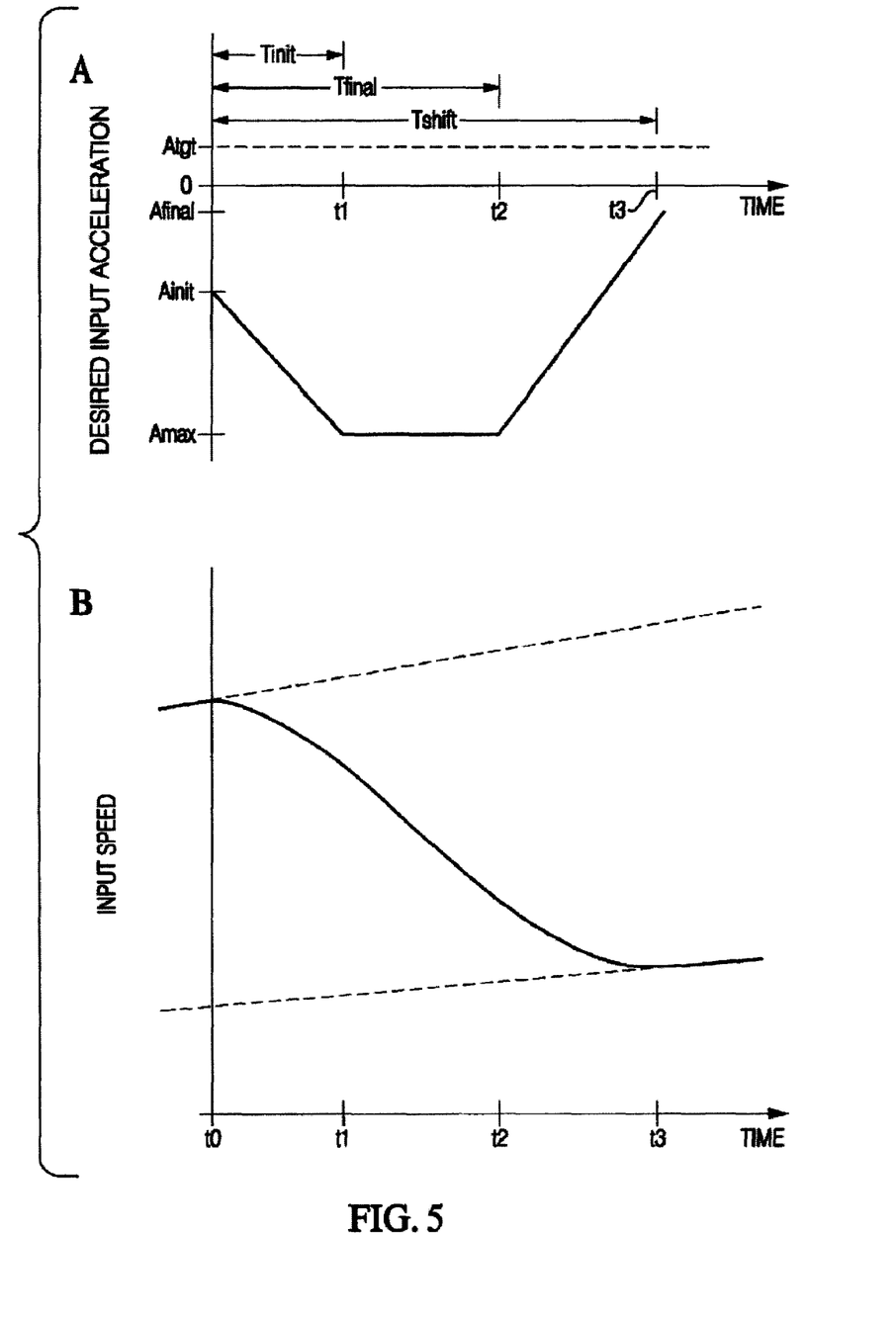
FIG. 5, Graphs A and B, depict the inertia phase of an upshift according to this invention; Graph A depicts a desired acceleration trajectory of the input shaft and Graph B depicts the corresponding speed trajectory of the input shaft.

An initial value TQout(des_init) of the output torque trajectory TRAJout_tq is used to develop an input acceleration trajectory TRAJin_accel. Referring to FIG. 5, Graph A depicts the input acceleration trajectory TRAJin_accel for the inertia phase of a power-on upshift from a current speed ratio SRold to a new speed ratio SRnew, assuming constant output acceleration Aout during the shift, and Graph B depicts a corresponding input speed profile. In practice, the output acceleration Aout may vary during a shift, as explained hereinbelow. As seen in Graph B, the input speed prior to the inertia phase is determined by the product TOS*SRold, whereas the input speed at the conclusion of the inertia phase is determined by the product TOS*SRnew.

The parameters of the acceleration trajectory of Graph A include the initial acceleration Ainit, the maximum acceleration Amax, the final acceleration Afinal, and the times Tinit, Tfinal, and Tshift. The terms Ainit and Amax are determined based on measured parameters, while the terms Afinal, Tinit, Tfinal and Tshift are determined by calibration as a function of one or more other parameters. For example, Tshift may be determined as a function of operator torque demand TQ, whereas Tinit and Tfinal may be predetermined percentages of Tshift. The value of Afinal is a calibrated value selected to achieve smooth shift completion. The target acceleration Atgt represents the input shaft acceleration at the conclusion of the inertia phase, and is determined according to the product (Aout*SRnew). As explained more fully below in reference to FIG. 6A, Ainit is computed based on the transmission input torque TQin and the desired output torque TQout(des_init) at the end of the torque phase, and Amax is computed based on the acceleration trajectory parameters and speed difference across the on-coming clutch, referred to herein as the slip speed.

According to the present invention, the inverse dynamic model of the transmission is used, on one hand, to determine an engine torque command TQcmd that will achieve both the input acceleration trajectory TRAJin_accel and the desired output torque trajectory TRAJout_tq and, on the other hand, to determine a feed-forward pressure command Ponc_FF for the on-coming clutch that will produce the input acceleration trajectory TRAJin_accel, given the engine torque command TQcmd. In other words, the inverse dynamic model is used to determine coordinated feed-forward control of both the on-coming clutch pressure and engine output torque.

The desired output torque trajectory TRAJout_tq is also used to determine the expected input speed TISexp. A feed-back pressure command Ponc_FB, based on the deviation of the measured input speed TIS from the expected input speed TISexp, is used to adjust the on-coming clutch pressure command Ponc to account for model errors. Finally, the closed-loop feedback error ERR is used to enable adaptive correction of the feed-forward control so that the feed-forward clutch pressure Ponc_FF more nearly produces the commanded input shaft acceleration.

Figure 6A:
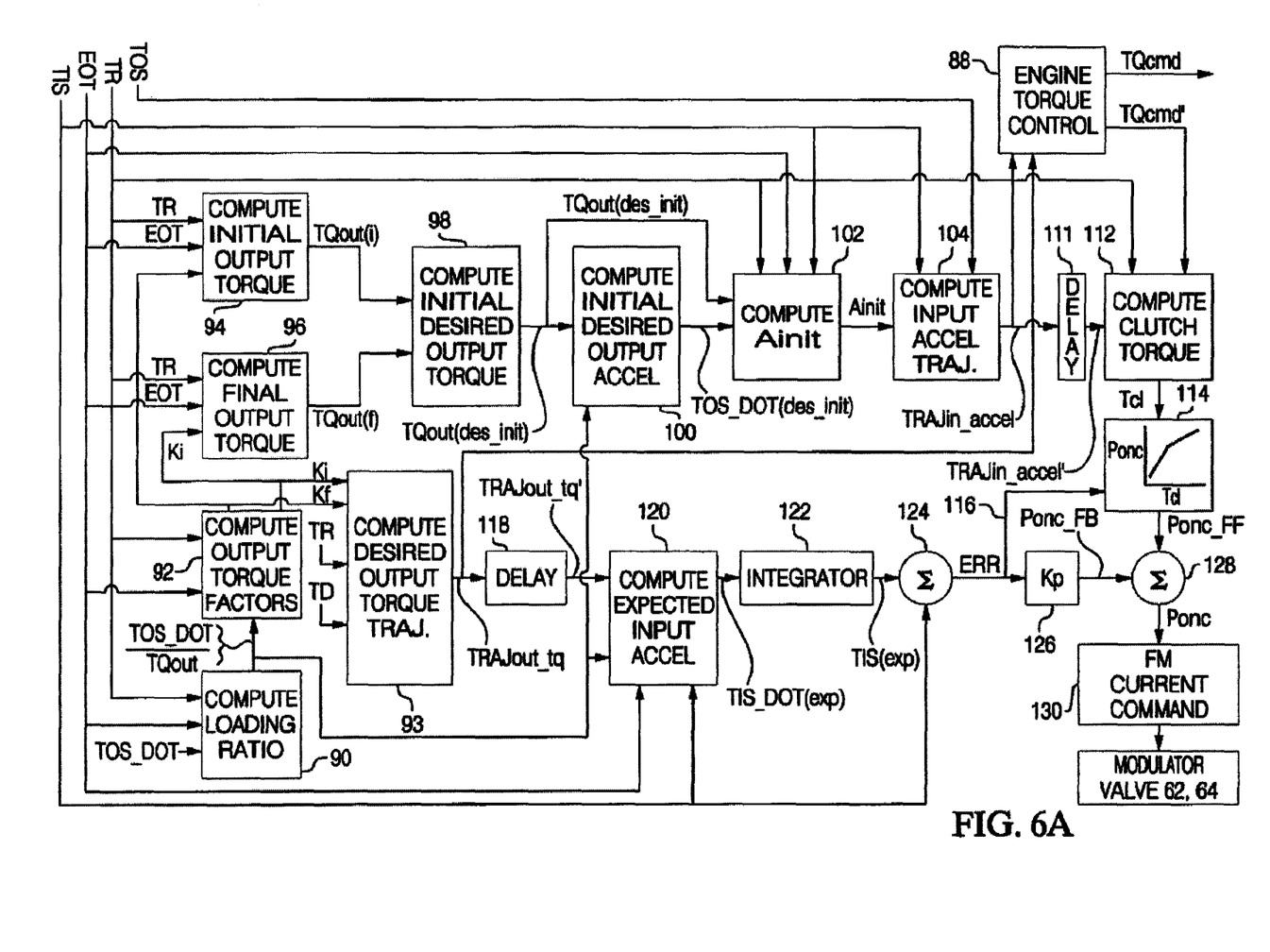
FIGS. 6A and 6B depict a block diagram of the control carried out by the control unit of FIG. 1 according to this invention.
Figure 6B:
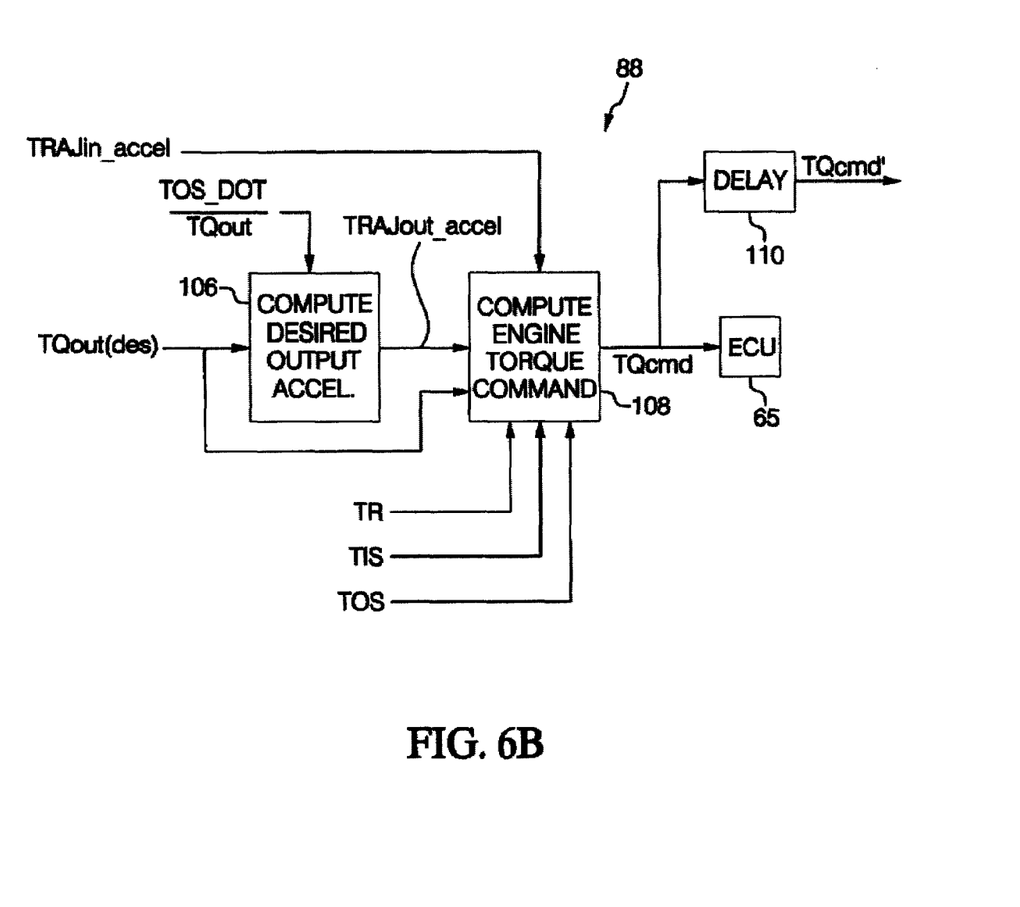

FIGS. 6A and 6B, taken together, depict a block diagram illustrating the control strategy of this invention, with the various blocks representing functions performed by transmission control unit 66. FIG. 6A is directed primarily to the on-coming clutch pressure control, with the engine torque control being represented by a single block 88. FIG. 6B, in turn, details the engine control block 88.

As explained hereinabove, and as indicated in FIGS. 6A and 6B, the engine torque and clutch pressure controls are interrelated. For example, the input acceleration trajectory TRAJin_accel is supplied as an input to both the engine torque and clutch pressure controls, and the engine torque command TQcmd is supplied as an input to the clutch pressure control. This allows the control unit 66 to coordinate the engine and transmission controls with the inverse dynamic model equations, as explained hereinbelow.

The block diagram inputs include the operator torque demand TQ, engine output torque EOT, engine speed ES, transmission input speed TIS, transmission output speed TOS, and torque ratio TR of torque converter 16. Various other inputs are derived from these inputs, such as a transmission output acceleration TOS_DOT, engine acceleration ES_DOT, torque converter speed ratio SR (that is, TIS/ES), and the rate of change of the speed ratio SR, referred to herein as SR_DOT.

The engine torque control is a feed-forward control based on the input acceleration trajectory TRAJin_accel and the desired output torque trajectory TRAJout_tq, and produces a torque command TQcmd, which is supplied to the engine control unit 65. The clutch pressure control, on the other hand, combines feed-forward control and feed-back control. The clutch pressure feed-forward control produces the feed-forward pressure command Ponc_FF based on delayed versions of the input acceleration trajectory TRAJin_accel and the engine torque command TQcmd referred to as TRAJin_accel' and TQcmd', respectively. The clutch pressure feed-back control produces the feed-back pressure command Ponc_FB by computing an expected input speed TIS(exp) from the desired output torque trajectory TRAJout_tq and comparing the expected speed TIS(exp) to the measured input speed TIS. The feed-forward and feed-back pressure commands are summed to determine the on-coming clutch pressure command Ponc.

The desired output torque is determined by blocks 90, 92, and 93 of FIG. 6A. The blocks 90 and 92 represent functions performed at the initiation of a shift command. The block 90 computes a vehicle loading ratio defined as the transmission output acceleration per unit transmission output torque (TOS_DOT/TQout), which effectively provides an estimate of the vehicle load and mass. The output torque term TQout is computed prior to the initiation of shifting according to the equation:

$$TQout = (K_1 * TR * EOT) + (K_2 * TOS\_DOT) + (K_3 * TR * ES\_DOT)$$

where the constants $K_1$, $K_2$ and $K_3$ are determined by calibration. The block 92 then computes torque scale factors $K_i$ and $K_f$ relating transmission output torque TQout to transmission input torque TQin for the initial and final speed ratios of the shift. In other words, $K_i$ defines the ratio TQout/TQin for the initial speed ratio, and $K_f$ defines the ratio TQout/TQin for the final speed ratio. The torque scale factors $K_i$ and $K_f$ are nearly equal to the initial and final speed ratios of the transmission 14, respectively, with some variation due to the effects of engine and transmission inertia. The actual values of $K_i$ and $K_f$ may be computed using the equation:

$$TOS\_DOT = (A * TQin) + (B * TQout)$$

and setting TOS_DOT equal to the product of TQout and the determined ratio (TOS_DOT/TQout) to account for the load and mass effects.

The loading ratio (TOS_DOT/TQout) and the torque scale factors $K_i$ and $K_f$ are applied as inputs along with the torque converter torque ratio TR and the operator torque demand TQ to the block 93, which computes the desired output torque trajectory TRAJout_tq. Computing the desired output torque trajectory TRAJout_tq involves computing demanded output torque trajectories TQout_dem(i) and TQout_dem(f) for the respective initial (i) and final (f) speed ratios of the shift, and then applying the scale factor $K_{sf}$ to the trajectories. The demanded output torque trajectories TQout_dem(i) and TQout_dem(f) are computed according to the equations:

$$TQout\_dem(i) = K_i * TR * TQ$$

and $$TQout\_dem(f) = K_f * TR * TQ$$

and the desired output torque trajectory TRAJout_tq is computed according to the equation:

$$TRAJout\_tq = K_{sf}[TQout\_dem(i) - TQout\_dem(f)] + TQout\_dem(f).$$

The scale factor $K_{sf}$ may be determined as described above in reference to FIG. 4, and serves to produce a desired output torque trajectory TRAJout_tq that takes into account operator demand and, if desired, operator preference (normal mode vs. towing mode, for example).

In a similar manner, blocks 94, 96, and 98 compute an initial desired output torque TQout(des_init) for purposes of constructing the input acceleration trajectory TRAJin_accel. In this case, however, the computations are based on the engine output torque input EOT received from engine control unit 65 instead of the operator demand torque TQ so that the acceleration trajectory TRAJin_accel is based on the torque the engine 12 is actually delivering. The blocks 94 and 96 compute output torque values TQout(i) and TQout(f) for the respective initial and final speed ratios involved in the shift, using the equations:

$$TQout(i) = K_i * TR * EOT$$

and $$TQout(f) = K_f * TR * EOT$$

The block 98 then computes the initial value of the desired initial output torque TQout(des_init) according to the equation:

$$TQout(des\_init) = K[TQout(i) - TQout(f)] + TQout(f)$$

where K is a calibration parameter.

The input acceleration trajectory TRAJin_accel is determined by blocks 100, 102, and 104. Block 100 determines the initial value of the desired torque phase output acceleration, TOS_DOT(des_init), according to the product of TQout(des_init) and the loading ratio (TOS_DOT/TQout). Block 102 computes the initial input shaft acceleration Ainit required to produce the desired initial output torque TQout(des_init) and the desired initial output acceleration TOS_DOT(des_init), given the engine torque EOT, engine speed ES, and torque converter parameters. The transmission input and output acceleration values TIS_DOT and TOS_DOT during a shift are modeled according to the equations:

$$TIS\_DOT = (a1 * TQin) + (a2 * TQcl) + (a3 * TQout)$$

and $$TOS\_DOT = (b1 * TQin) + (b2 * TQcl) + (b3 * TQout)$$

where a1, a2, a3, b1, b2 and b3 are calibration constants, and TQcl is the torque capacity of the on-coming clutch, assuming an ideal transition between the on-coming and off-going clutches. Solving the model equations to eliminate TQcl, expressing TQin in terms of EOT, ES, TIS_DOT, and the torque converter parameters SR and SR_DOT, and solving for TIS_DOT yields an expression for Ainit in terms of TQout(des_init), TOS_DOT(des_init), EOT, ES, SR, SR_DOT, and calibration constants $K_a$, $K_b$, $K_c$, $K_d$, and $K_e$, as follows:

$$Ainit = [K_a * TR * (EOT + K_b * ES * (SR\_DOT/SR)) + K_c * TQout + K_d * TOS\_DOT]/(1 + K_e(TR/SR))$$

The initial desired acceleration Ainit is computed repeatedly during the fill phase of the shift to account for any changes in EOT and/or TOS_DOT, and a value of Ainit at the end of the fill phase is supplied as an input to block 104. The output of block 104 is the input acceleration trajectory TRAJin_accel, and the trajectory value is maintained at Ainit until the input speed TIS begins to change toward the new speed ratio SRnew (that is, until the onset of the inertia phase of the shift). Thereafter, the block 104 repeatedly computes the input acceleration trajectory TRAJin_accel based on the computed slip speed SLIP of the on-coming clutch and the trajectory parameters Ainit, Afinal, Tinit, Tshift, and Tfinal. The slip speed SLIP at any time t is computed in accordance with the equation:

$$SLIP(t) = (TOS * SRnew) - TIS + [Atgt * (Tshift - t)]$$

where Atgt is the target acceleration of the transmission input shaft 18 (computed as the product TOS_DOT*SRnew) and Tshift is the selected duration of the inertia phase. The acceleration trajectory parameter Amax, in turn, is computed so that the area under the acceleration trajectory is equal to SLIP. The trajectory parameters, including Atgt, SLIP and Amax, are computed periodically during the shift to reflect any changes in the output acceleration TOS_DOT.

The input acceleration trajectory TRAJin_accel and the desired output torque trajectory TRAJout_tq are applied as inputs to the engine torque control block 88. Referring to FIG. 6B, block 106 computes a desired output acceleration trajectory TRAJout_accel based on the desired output torque trajectory TRAJout_tq according to the product of TRAJout_tq and the loading ratio (TOS_DOT/TQout). The block 108, in turn, computes the engine torque command TQcmd based on TRAJin_accel, TRAJout_accel and TRAJout_tq. As in the computation of Ainit, this involves solving the transmission model equations to eliminate TQcl, expressing TQin in terms of EOT, ES, TIS_DOT, and the torque converter parameters SR and SR_DOT. With the exception that the equation is solved for EOT in terms of TRAJout_tq, TRAJin_accel, TRAJout_accel, ES, TR, SR, SR_DOT, and calibration constants $K_1$, $K_2$, $K_3$, $K_4$, and $K_5$, as follows:

$$TQcmd = (K_1 + K_2 * TR/SR)(TRAJin\_accel/TR) + K_3 * (TRAJout\_tq/TR) + K_4 * ES * SR\_DOT/SR + K_5 * (TRAJout\_accel)/TR$$

The torque command TQcmd so computed represents the engine torque for satisfying the trajectories TRAJout_tq, TRAJin_accel, TRAJout_accel, given the engine speed ES and the torque converter parameters, and is supplied as an input to engine control unit 65. As explained below, the on-coming clutch torque Tcl is solved using the same model equations, with the engine torque term being set equal to a delayed version TQcmd' of the torque command TQcmd and the input acceleration term being set equal to the delayed version TRAJin_accel' of the input acceleration trajectory TRAJin_accel. Thus, the output of block 108 is also supplied as an input to the delay block 110, which determines TQcmd'. The delay is required since the response time of the clutch pressure control is typically faster than the response time of the engine torque control. In other words, the premise is that the system 44 can achieve a commanded on-coming clutch pressure Ponc faster than the engine control unit 65 can achieve a commanded engine output torque TQcmd. Accordingly, the on-coming clutch torque command Tcl is based on a delayed version of the torque command TQcmd sent to engine control unit 65.

A delay block 111 determines a delayed input acceleration trajectory TRAJin_accel' for use by a clutch torque computation block 112, thereby accounting for the above-described difference in response times of the clutch pressure and engine torque controls. The block 112 exploits the transmission model equations to compute the on-coming clutch torque command Tcl that will satisfy the delayed input acceleration trajectory TRAJin_accel', given the delayed engine torque command TQcmd' and the torque converter characteristics. The basic model equations are the same as those described above with respect to block 102, but in this case, the equations are solved for the on-coming clutch torque TQcl, yielding:

$$TQcl = [K_1 + K_2(TR/SR)] * TRAin\_accel' + [K_3 * TR * TQcmd'] + [K_4 * TR * SR\_DOT * ES/SR]$$

where $K_1$, $K_2$, $K_3$ and $K_4$ are constants (including the mass/load ratio TOS_DOT/TQout). The clutch torque TQcl, in turn, is applied to block 114, which outputs the feed-forward pressure Ponc_FF. In the illustrated embodiment, the block 114 represents a look-up table of clutch pressure vs. clutch torque for the particular on-coming clutch, and comprises a discrete number of data points forming a piece-wise linear approximation of the pressure vs. torque relationship. As indicated by broken line 116, the data points are subject to adaptive adjustment based on the closed-loop speed error, as a means of compensating for any modeling errors of blocks 88 and 112.

The on-coming clutch feed-back control includes the blocks 118, 120, 122, 124, 126, and 128, and is based on the comparison of the measured input speed TIS with an expected input speed TIS(exp) derived from the engine output torque EOT and the output torque trajectory TRAJout_tq. The delay block 118 develops a delayed version (TRAJout_tq') of the output torque trajectory TRAJout_tq, the duration of the delay being representative of the combined electrical and hydraulic delays incurred in producing the commanded on-coming pressure Ponc. The value of TRAJout_tq' at any time during the shift represents the expected output torque, assuming that the model equations are accurate and that the feed-forward control is faithfully carried out. The block 120 uses the delayed output torque trajectory TRAJout_tq' and the engine output torque EOT to compute the corresponding input acceleration, referred to herein as the expected input acceleration, or TIS_DOT(exp). This involves solving the same equation as discussed above in reference to block 102, with the output torque being given by TRAJout_tq', the output acceleration being given by the product of TRAJout_tq' and the loading ratio (TOS_DOT/TQout), as follows:

$$TIS\_DOT(exp) = \frac{\begin{bmatrix} K_a * TR * (EOT + K_b * ES * (SR\_DOT/SR)) + \\ [K_c * TRAJout\_tq'] + K_d * TRAJout\_tq' * \\ (TOS\_DOT/TQout) \end{bmatrix}}{(1 + K_e(TR/SR))}$$

The block 122 then integrates the expected input acceleration TIS_DOT(exp) to compute the expected input speed TISexp, using a conventional discrete trapezoidal integration technique, as represented by the equation:

$$TISexp(current) = TISexp(last) + T/2[TRAJ(current) + TRAJ(last)]$$

where TISexp(current) and TISexp(last) are the current and last values of the expected input speed, T is the update rate, and TRAJ(current) and TRAJ(last) are the current and last values of the expected input acceleration TIS_DOT(exp). The expected input speed TISexp so developed is then applied along with the measured input speed TIS to a summation block 124, determining an input speed error ERR. The block 126 applies a proportional gain term to ERR to determine the feed-back pressure command Ponc_FB, which is combined with Ponc_FF in summation block 128 to determine the pressure command Ponc. The pressure command Ponc, in turn, is applied as an input to block 130, which develops an electrical current command for the respective fluid control valve 62, 64.

Figure 7:
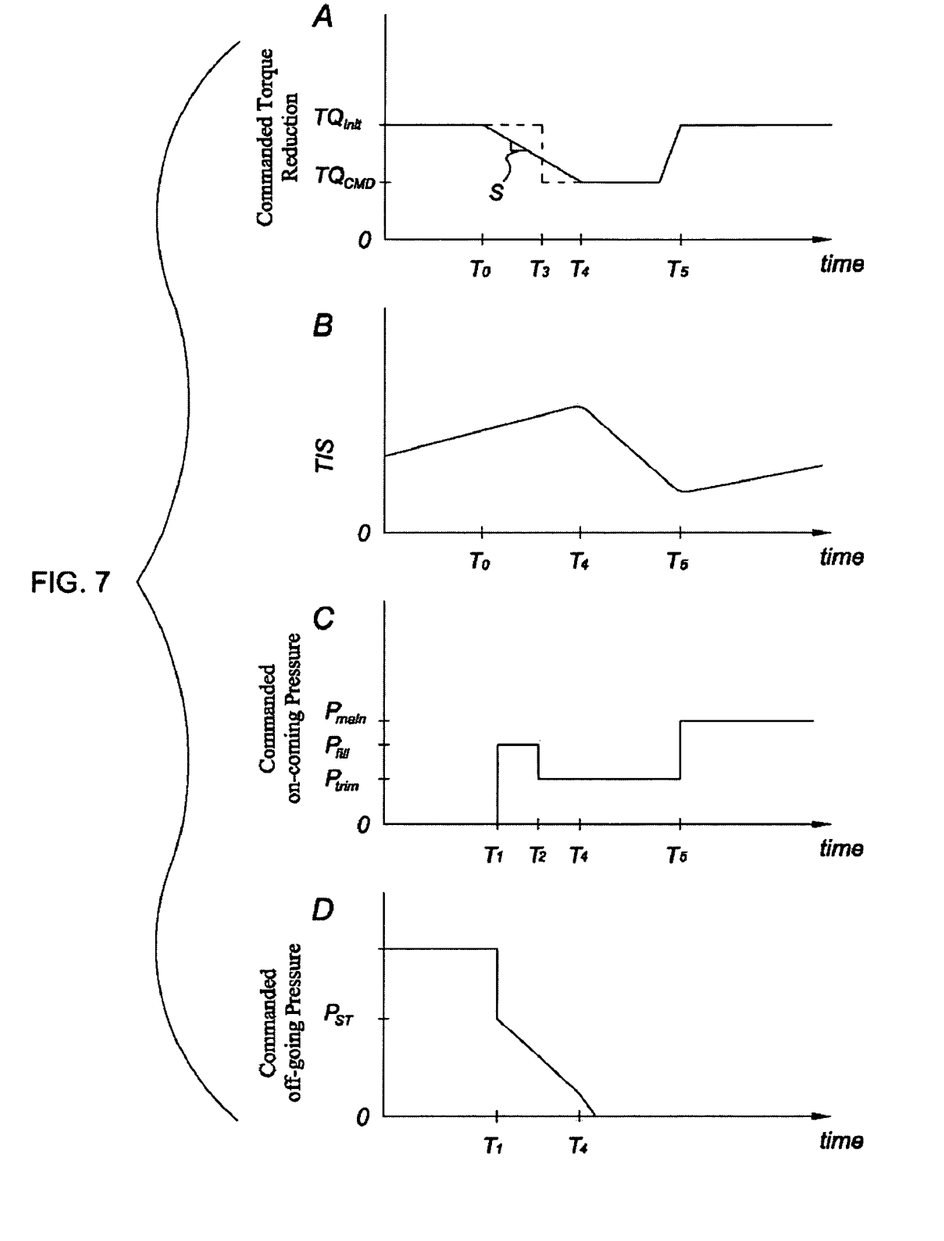
FIG. 7, Graphs A through D, depict an exemplary upshift according to the present invention; Graph A depicts a commanded engine torque reduction versus time consistent with the present invention, Graph B depicts a transmission input speed versus time, Graph C depicts commanded on-coming clutch pressure versus time, and Graph D depicts command off-going clutch pressure versus time.

Referring now to FIG. 7, a power on upshift in accordance with the present invention is graphically illustrated, with Graphs A through D respectively depicting the commanded torque reduction versus time, a transmission input speed TIS versus time, the commanded on-coming clutch pressure versus time, and a commanded off-going clutch pressure versus time. Those skilled in the art will recognize that the torque converter 16 of FIG. 1 includes a turbine, not shown, mounted to the input shaft 18, shown in FIG. 1, for unitary rotation therewith. Accordingly, turbine speed is substantially equal to the transmission input speed TIS. The interval $T_1$ to $T_4$ defines the fill phase of the shift, and the shift is completed in the inertial phase or the ensuing interval $T_4$ to $T_5$. Referring to Graph C, the fill phase is initiated at time $T_1$ by commanding the fill pressure Pfill for the on-coming clutch, and a starting pressure Pst for the off-going clutch. The pressure of the off-going clutch is commanded to decrease from Pst for the remainder of the fill phase. The fill pressure Pfill may be selected based on various considerations, depending on how quickly the on-coming clutch is to be filled. Significantly, however, the fill pressure Pfill is scheduled low enough to ensure that there is a known and predictable relationship between the commanded fill pressure and actual fluid flow. If the fill pressure is sufficiently high (at the main regulated control pressure Pmain, for example), the supply of fluid to the on-coming clutch may be flow restricted, significantly altering the relationship between the commanded fill pressure and the actual fluid flow. When the cumulative fluid volume supplied to the on-coming clutch reaches a predetermined reference volume at time $T_2$, the commanded on-coming clutch pressure is reduced to a trim pressure having an initial value of Ptrim, as determined using the methods to determine the on-coming pressure command value Ponc described hereinabove. The trim pressure Ptrim is the desired initial pressure for the inertial phase of the shift, and may be adjusted over time using the control method described hereinabove.

As shown in FIG. 7 Graph C, the trim pressure remains substantially constant over the interval $T_2$ to $T_5$, whereafter the on-coming pressure is increased to the main control pressure Pmain. At time $T_4$, the clutch piston, not shown, begins to compress the clutch plates, not shown. At such point, the on-coming clutch has sufficient capacity to initiate the inertial phase of the shift; the off-going clutch is released as seen in Graph D, and the transmission input shaft speed TIS decelerates from a trajectory, delimited by $T_0$ to $T_4$, dictated by the old or current speed ratio to a trajectory, delimited by $T_5$ onward, dictated by the new speed ratio as seen in Graph B. At time $T_5$, the speed change is complete, and the on-coming pressure is commanded to the main control pressure Pmain as mentioned above. As indicated above, the off-going clutch is ideally released as soon as the on-coming clutch gains capacity.

Referring to FIG. 7 Graph A, in order to enable smooth shifting, prior art transmission control strategies have employed a step-like torque reduction as indicated by the broken line at $T_3$. This step-like torque reduction would nearly instantaneously command a decrease in engine torque from an initial torque TQinit, i.e. the current operator requested engine torque to the engine torque command TQcmd value calculated using the methods described hereinabove. Ideally, the step-like torque reduction will occur at the instant that the on-coming clutch gains capacity, but due to calibration complexities, this is not always possible. This step-like decrease would usually be commanded with a predetermined delay time to account for an engine torque response delay such that the actual engine torque reduction would not occur prior to the on-coming clutch gaining capacity. Should this situation occur, an objectionable sag in engine torque would be felt by the operator of the vehicle. As such, calibrators tend to command the step-like torque reduction to occur after the on-coming clutch gains capacity. Although more desirable from a shift quality standpoint, if the time delay between the engine torque reduction and the oncoming clutch gaining capacity is large, poor shift quality will result due to tie-up between the on-coming clutch and the off-going clutch. In accordance with the present invention, the torque reduction is commanded to decrease in a ramp-like or sloping fashion from the initial torque TQinit to the engine torque command TQcmd value calculated using the methods described hereinabove. This torque reduction occurs between time $T_0$ and $T_4$ and as such has a gradual slope S in contrast to the step-like nature of the prior art torque reduction strategies. The slope S is preferably between $-1$ Nm per second to $-800$ Nm per second. In general an engine having a large engine torque rating will have a steeper slope than those having low engine torque rating, thereby allowing engines of differing torque ratings to achieve the desired torque reduction in a given period. The engine torque reduction may begin prior to the fill command at time $T_1$ or after depending on the fill time of the on-coming clutch. It is preferred that the torque reduction be completed at or near the point where the oncoming clutch gains capacity, i.e. at time $T_4$. The time $T_4$ may be predicted based on learned response from previous shifts.

In summary, the control of this invention uses an inverse dynamic model of the transmission to compute the engine torque and on-coming clutch pressure required to achieve a desired output acceleration trajectory during an upshift. The shifting calibration effort is greatly simplified as compared with known open-loop controls, and the engine and on-coming clutch controls are inherently coordinated. Any modeling errors of the feed-forward control are detected in the determine of closed-loop error, and the control compensates for steady-state errors through corresponding adjustment the feed-forward control—specifically, the data points of the clutch pressure vs. clutch torque transfer function table (block 114). Additionally, by decreasing the engine torque in a ramp-like or sloping fashion to the value determined using the inverse dynamic model described herein, smooth shifting is enabled, while significantly reducing the likelihood of tie-up between the on-coming clutch and the off-going clutch.

While the best modes for carrying out the invention have been described in detail, those familiar with the art to which this invention relates will recognize various alternative designs and embodiments for practicing the invention within the scope of the appended claims.

The invention claimed is:

1. A method of controlling torque of an engine operatively connected to an automatically shiftable transmission during shifting of the automatically shiftable transmission, the method comprising:

determining an engine output torque command value;

commanding an output torque of the engine in a ramp-like or sloping torque reduction to said engine output torque command value during shifting of the automatically shiftable transmission, wherein the shifting of the automatically shiftable transmission includes the engagement of an on-coming clutch;

wherein the on-coming clutch engagement includes an inertial phase where the on-coming clutch gains capacity;

commanding said ramp-like or sloping torque reduction to end substantially at the initiation of the inertial phase; and commanding said output torque of the engine to increase after the shifting has occurred.

2. The method of claim 1, wherein said ramp-like or sloping torque reduction has a slope of between $-1$ Nm per second to $-800$ Nm per second.

3. The method of claim 1, wherein determining said engine output torque command value includes:

determining a desired torque trajectory of an output shaft of the automatically shiftable transmission;

determining a desired acceleration trajectory of an input shaft of the automatically shiftable transmission; and applying said desired torque trajectory and said desired acceleration trajectory to an inverse dynamic model of the automatically shiftable transmission to determine said engine output torque command value.

4. The method of claim 3, wherein applying said desired torque trajectory and said desired acceleration trajectory to said inverse dynamic model to determine said engine output torque command includes:

determining a desired output acceleration trajectory based on said desired output torque trajectory; and applying said desired output acceleration trajectory, said desired torque trajectory and said desired input acceleration trajectory to said inverse dynamic model to determine said engine output torque command.

5. The method of claim 1, wherein the on-coming clutch engagement includes a fill phase, the method further comprising commanding said ramp-like or sloping torque reduction to begin prior to initiation of the fill phase.

6. The method of claim 1 wherein the on-coming clutch engagement includes a fill phase, the method further comprising commanding said ramp-like or sloping torque reduction to begin after initiation of the fill phase.

7. A method of controlling an on-coming clutch pressure and engine output torque during an upshift of an automatically shiftable transmission of a vehicle having an input shaft coupled to an engine and an output shaft coupled to drive the vehicle, the method comprising:
  determining a desired torque trajectory of the output shaft;
  determining a desired acceleration trajectory of the input shaft;
  applying said desired torque trajectory and said desired acceleration trajectory to an inverse dynamic model of the automatically shiftable transmission to determine an engine output torque command value;
  commanding engine output torque in a ramp-like or sloping torque reduction in accordance with said engine output torque command value;
  applying said desired acceleration trajectory to said inverse dynamic model of the automatically shiftable transmission during an inertial phase of the upshift to obtain an estimated on-coming clutch torque at the commanded engine output torque;
  determining a feed-forward clutch pressure command based on said estimated on-coming clutch torque requirement;
  determining an on-coming clutch pressure command in accordance with the feed-forward pressure command;
  commanding the on-coming clutch in accordance with said on-coming clutch pressure command; and
  commanding said ramp-like or sloping torque reduction to end substantially at the initiation of said inertial phase.

8. The method of claim 7, wherein applying said desired acceleration trajectory to the inverse dynamic model of the transmission includes:
  delaying said commanded engine output torque and said desired acceleration trajectory to determine a delayed desired acceleration trajectory and a delayed commanded engine output torque, respectively; and
  applying said delayed desired acceleration trajectory and said delayed commanded engine output torque to said inverse dynamic model to obtain said estimated on-coming clutch torque.

9. The method of claim 7, further comprising:
  determining a measured speed of the input shaft;
  determining an expected speed of the input shaft; and
  adjusting said on-coming clutch pressure command in accordance with a feed-back adjustment based on a deviation of said measured speed from said expected speed to compensate for errors in said dynamic model.

10. The method of claim 9, wherein determining said expected speed of the input shaft includes:
  delaying said output torque trajectory to estimate an expected output torque;
  determining an expected input acceleration based on said expected output torque and said engine output torque; and
  integrating said expected input acceleration to determine said expected speed of the input shaft.

11. The method of claim 7, wherein applying said desired torque trajectory and said desired acceleration trajectory to said inverse dynamic model of the automatically shiftable transmission to determine said engine output torque command includes:
  determining a desired output acceleration trajectory based on said desired output torque trajectory; and
  applying said desired output acceleration trajectory, said desired torque trajectory, and said desired input acceleration trajectory to said inverse dynamic model to determine said engine output torque command.

12. A method of controlling engine output torque during an upshift of an automatically shiftable transmission of a vehicle having an input shaft coupled to an engine and an output shaft coupled to drive the vehicle, the method comprising:
  determining a desired torque trajectory of the output shaft;
  determining a desired acceleration trajectory of the input shaft;
  applying said desired torque trajectory and said desired acceleration trajectory to an inverse dynamic model of the automatically shiftable transmission to determine an engine output torque command value;
  commanding engine output torque in a ramp-like or sloping torque reduction in accordance with said engine output torque command value;
  wherein said ramp-like or sloping torque reduction has a slope of between −1 Nm per second to −800 Nm per second, wherein the shifting of the automatically shiftable transmission includes the engagement of an on-coming clutch;
  wherein the on-coming clutch engagement includes an inertial phase where the on-coming clutch gains capacity; and
  commanding said ramp-like or sloping torque reduction to end substantially at the initiation of the inertial phase.

* * * * *